Sept. 29, 1931.  A. D. STONER  1,825,557
RABBIT HUTCH
Filed Aug. 20, 1930    2 Sheets-Sheet 1
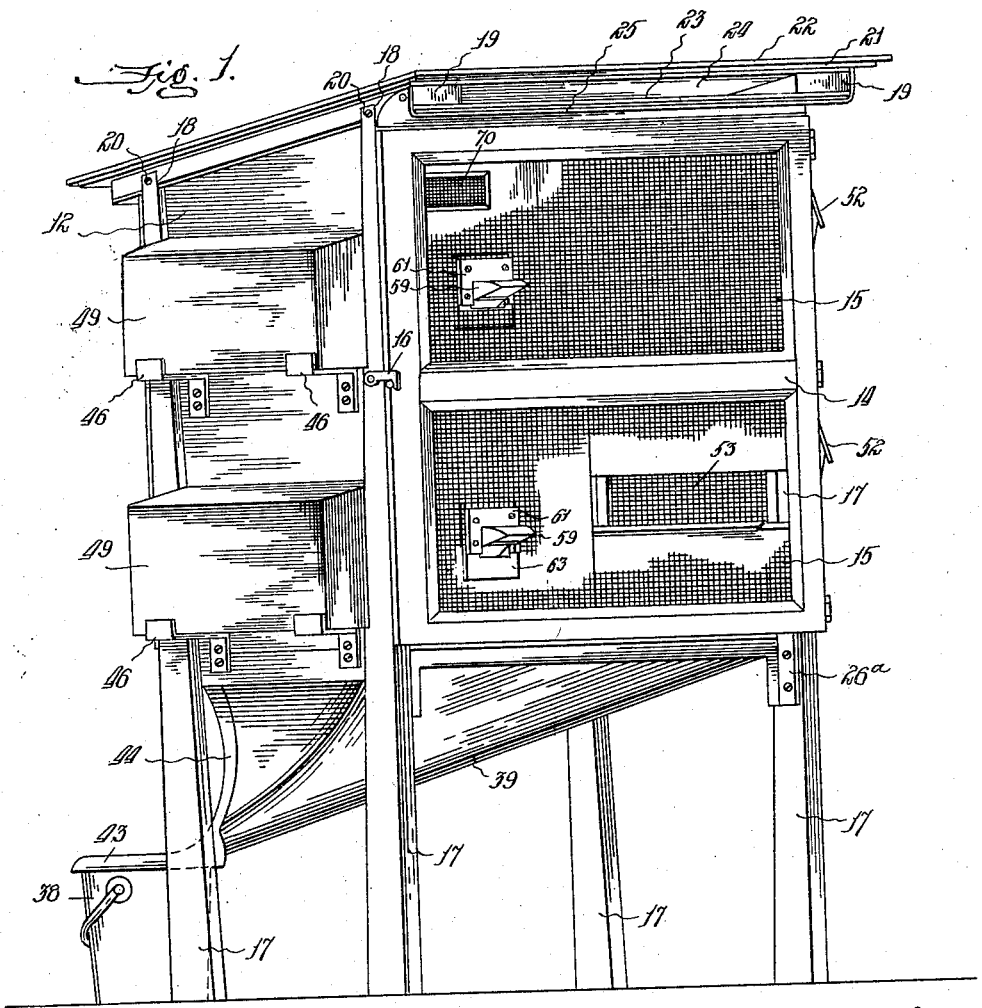
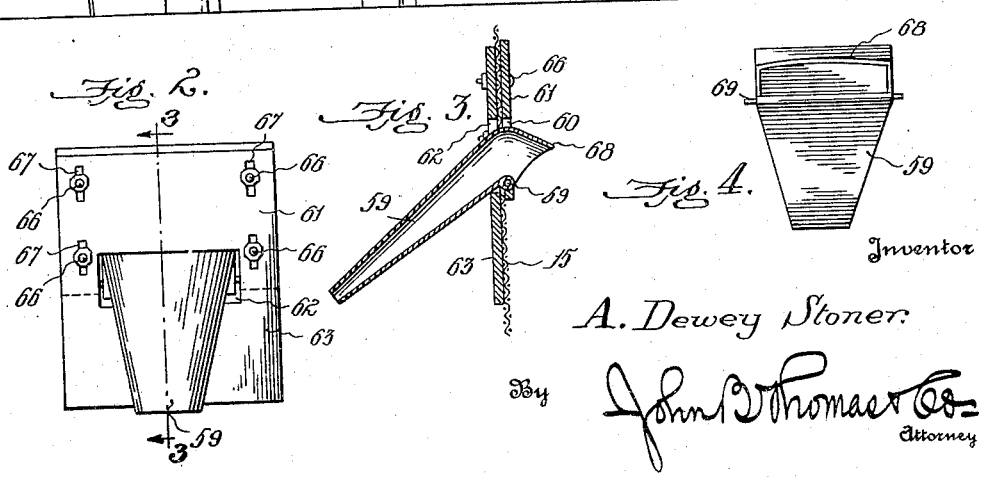
Inventor
A. Dewey Stoner.
By John B. Thomas Co.
Attorney Sept. 29, 1931.  A. D. STONER  1,825,557
RABBIT HUTCH
Filed Aug. 20, 1930  2 Sheets-Sheet 2
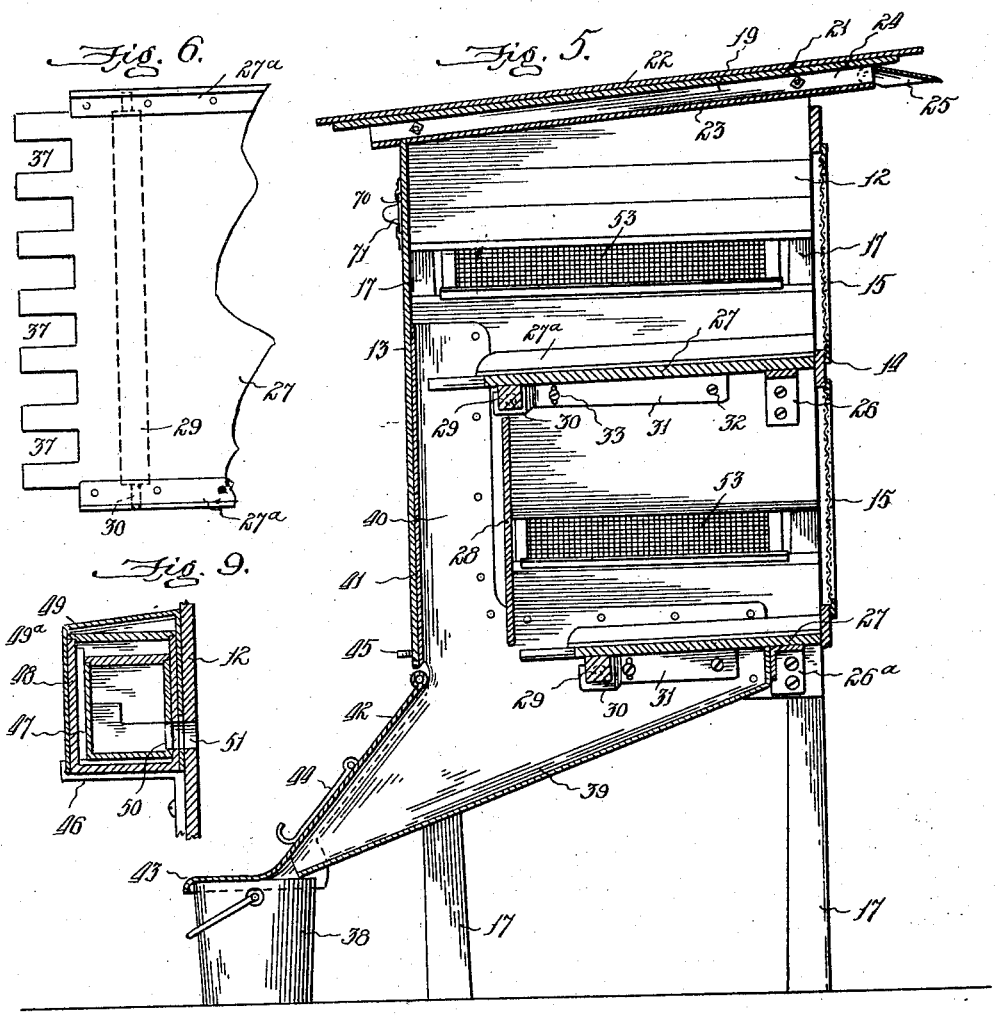
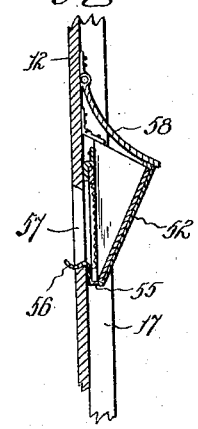
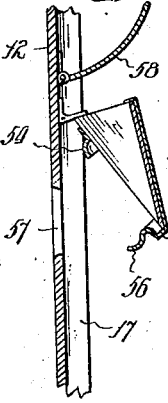
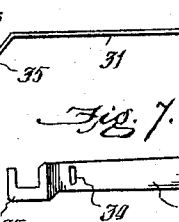
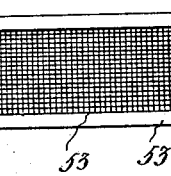
Inventor:
A. Dewey Stoner
By John B. Thomas & Co.
Attorneys.

Patented Sept. 29, 1931

1,825,557

UNITED STATES PATENT OFFICE

ABRAHAM DEWEY STONER, OF NEW WINDSOR, MARYLAND

RABBIT HUTCH

Application filed August 20, 1930. Serial No. 476,637.

My invention relates to enclosures or houses adapted to confine animals for breeding purposes, and relates more especially to that special type of animal houses which are commonly known as rabbit hutches.

The principal object of my invention is to provide a substantially built structure of this kind that will be of material aid to the breeder in caring for the animals in feeding them and keeping the house or hutch in sanitary condition, as well as provide nests which will be protected from cold weather and form a secluded retreat for the mother rabbit.

With these principal objects in view my invention contemplates the construction of an animal house or rabbit hutch having compartments one above the other with floors adapted to be tilted upwardly at their forward ends to deposit droppings and other refuse into a chute extending rearwardly from the underside of the body of the house to a bucket or other container at the discharge end of the chute, together with feeding devices for convenience in supplying the animals with food and detachable nest boxes preferably located at the outside of the house against one of the side walls thereof so that the breeder can more easily keep tab on the condition of the baby rabbits.

My invention consists in the particular construction of the rabbit hutch and appurtenances, all as hereinafter fully described and more specifically set forth in the appended claims.

In the drawings:—

Figure 1 is a perspective view of an animal house or rabbit hutch constructed in accordance with my invention.

Fig. 2 is an enlarged detail front elevation of one of the feeding devices.

Fig. 3 is a sectional view on the line 3—3 of Fig. 2.

Fig. 4 is a front elevation of the chute by which the food is delivered into the compartment.

Fig. 5 is a central vertical sectional view through the house.

Fig. 6 is a fragmentary view of the rear end of one of the floors.

Figs. 7 and 8 are side and top views, respectively, of one of the adjustable hangers for supporting the tilting floors.

Fig. 9 is a vertical sectional view through one of the nests.

Fig. 10 is a vertical sectional view through one of the other feeding boxes, showing the same in position for feeding.

Fig. 11 is a similar view with the hinged feed box swung forward and the screen removed; and Fig. 12 is a detail front elevation of the removable screen of the feed box.

In carrying out my invention the framework of the house or rabbit hutch consists of opposite side walls 12—12, rear wall 13, and an open front covered by a hinged door 14 preferably having screened panels 15 and fastened by a catch 16; the said framework being supported by corner posts 17 located at the outside of the side walls 12 and provided with tenons 18 at their upper ends fitting in mortises in wooden strips 19 forming part of the roof structure secured in place by bolts 20. The roof which is attached to the strips 18 is made up of sheathing 21 covered by tin 22 or other roofing material, and spaced from the roof is a ceiling 23 providing an air space 24 above the latter at the forward end and which has a pivoted hood or shield 25 to protect the air space from the weather as well as shield the screened door from rain and snow. It will be noted that the posts 17 are of sufficient length to elevate the framework a desired distance above the ground, and to brace the lower portion of the front of the house there are angle bars 26 and 26a extending between the side walls 12 while the upper end of said front is braced by the roof structure.

Although I have shown the framework as constructed to provide two compartments, one above the other, the house or rabbit hutch may be built to form a single compartment or enclosure, in either instance the compartment or compartments being provided with a tilting floor 27 extending from the front end thereof and terminating a slight distance from the rear wall 13 of the upper compartment and a partition 28 of the lower compartment, and as each floor is similarly mounted in the framework a description of one will apply to the other, like numerals of reference being employed; that is, each floor is pivoted near its rear end by providing the same with a cross-piece 29 having gudgeons 30 at the ends thereof journaled in adjustable brackets 31 attached to the inner side of the walls 12—12 by screws 32 and 33, the screw 33 passing through a slot 34 in the bracket so that the inclination of the floor may be varied, the front ends of the upper and lower floors resting upon the angle bars 26 and 26a respectively. As shown in Figs. 7 and 8 the supporting bracket for the floors is made of a strip of metal bent outwardly and rearwardly at one end, as at 35, with the outwardly projecting end cut and bent inwardly to provide a seat 36, for the gudgeon, projecting inwardly from between the upstanding portions of the bracket, whereby a simple and effective bearing bracket is provided for supporting the floors. The pivoting of the floors is intended for the purpose of easily discharging refuse from the rear end thereof, and to permit whatever refuse may be pushed by the animal to the rear end of the floor to be automatically discharged, the said rear end is cut away at intervals as shown in Fig. 6 providing spaced openings 37. To provide a close joint between the sides of the floor and sides of the compartments, as well as prevent particles of refuse or other matter from dropping from the upper to the lower floor bent metal strips 27a are attached to the opposite edges of the floor, and for receiving the refuse and depositing it into a bucket or other receptacle 38 the lower end of the body of the house is provided with a rearwardly projecting chute 39 the forward end of which projects to the angle bar 26a, so that in case a slatted or partly slatted floor is used the chute will receive refuse falling between the slats. The sides 40 of the metal chute are extended up the side walls of the house as shown in Fig. 5 to protect them from the refuse, and similarly the rear wall is protected by a sheet of metal 41, and to enclose the chute in such manner as to provide access thereto as well as for cleaning the same it is covered by a lid 42, said lid being extended at its lower end to form a cover 43 for the bucket or receptacle receiving the refuse. When the lid is open it is supported by a hook 44 engaging an eye 45 secured to the rear wall 13.

Each compartment is provided with a nest box 49 preferably located at the outside of the house and supported by brackets 46, each nest box consisting of an inner box 47 enclosed within the outer box 48 and the latter protected by a metal casing 49a the upper end of which providing a roof for the nest box being inclined while the four sides enclose the outer box, the inner side of the complete box being provided with a hole 50 registering with the hole 51 in the side wall 12 of the house to provide ingress and egress for the rabbit.

For feeding vegetable matter to the rabbits I provide a hinged feed box 52 preferably triangular in cross-section and hinged at its upper or wider end to the outside of the side wall opposite that to which the nest boxes are attached, said feed box being provided with a hinged lid 58 and with a removable screen 53 held in place by upper and lower metal straps 54 and 55, the strap 55 being formed at the lower end of a sheet of metal encasing the trough-shaped box and is extended inwardly to form a trough 56. An opening 57 is in the side wall to communicate with the feed box, and the trough extends through the lower end of said opening. The removable screens have frames 53a enclosing the same as shown in Fig. 12 and they are removable from the feed boxes so that one having a larger or smaller mesh may be used according to the character of food to be fed to the rabbits, and in order to provide for feeding grain or other small food into the compartment a second feeder is attached to the panel of the door, consisting of a metal chute 59 pivoted in an opening 60 at the lower end of a block 61 and extending through an opening 62 in a companion block 63, said blocks being clamped against the inner and outer sides of the screen panel by means of bolts 66 passing through the block 61 and through slots 67 in the block 63, and as the chute rests upon the bottom of the opening 62 of the block 63 adjustment of the latter with respect to block 61 will change the inclination of said chute. The upper wall of the chute is extended forwardly in the form of a hood 68 while the rear end thereof extending into the compartment is gradually contracted as shown in the drawings, the said chute being pivoted on a rod 69 bearing in the block 61 at opposite sides of the opening 60. It will be understood of course that the screen of the door is cut away sufficient only to receive the chute and that the screen wire is clamped between the blocks or wooden pieces 61 and 63 at the sides and top of the smaller block or wooden piece 61.

For the purpose of ventilating the rabbit hutch an opening is provided in the upper part of the rear wall 13 and covered by a screen 70 with a sliding cut-off 71.

As hereinbefore stated my invention is especially adapted to provide a structure that will be useful for breeding rabbits, but it will be understood that it may be used for breeding other animals, and in any case it provides a house of such construction that it will be convenient for the breeder to not only maintain a sanitary condition but also facilitate the feeding of the animals as well as inspect the condition of the litter without disturbing the mother for the reason that the nests are located outside of the living compartments and access thereto may be had by simply removing the casing and covers of the enclosed boxes. Furthermore, the feeding device which is clamped to the screen wire of the door permits grain or other small foods to be placed in the compartments without opening the door, the construction of this feeding device being such that it can be manufactured and sold as a separate article for application to animal houses generally.

I claim:

1. An animal house comprising side and rear walls attached to corner posts by which they are supported above the ground, a door hinged to the front of the house between the side walls thereof, and a roof structure mounted on the upper ends of the posts above the walls and door, said roof structure consisting of side strips to the upper and lower sides of which the roof and ceiling are attached to form an air space, and a hood pivoted to the forward ends of the side strips of the roof structure to project in front of the air space and adapted to be folded below the projecting portion of the ceiling.

2. An animal house comprising side and rear walls attached to corner posts by which they are supported above the ground, a door hinged to the front of the house between the side walls, a roof structure mounted on the upper ends of the corner posts, vertically adjustable brackets secured to the inner sides of the side walls, and transverse supports spaced from said brackets; together with floors engaging the supports and having gudgeons resting in the brackets to provide for tilting the floors in discharging refuse therefrom.

3. An animal house comprising side and rear walls attached to corner posts by which they are supported above the ground, a door hinged to the front of the house between the side walls, a roof structure mounted on the upper ends of the corner posts, and floors pivoted between the side walls so that they may be tilted for discharging refuse; together with a chute secured below the lower floor and having a discharge spout.

4. An animal house comprising side and rear walls attached to corner posts by which they are supported above the ground, a door hinged to the front of the house between the side walls, a roof structure mounted on the upper ends of the corner posts, and floors between the side walls; together with a chute secured below the lower floor and having a discharge spout, a lid covering the chute and hinged thereto and a projection at the lower end of the lid forming a cover for a bucket into which said chute discharges.

5. In combination with an animal house having a framework comprising side and rear walls attached to corner posts by which they are supported above the ground, a door hinged to the front of the house between the side walls and a roof structure mounted on the upper ends of the corner posts; of a floor between the side walls to form a compartment above said floor, a vertical partition below the floor and spaced from the rear wall, a floor extending forwardly from the lower end of the partition to provide a second compartment below the aforementioned compartment, and a chute below the last mentioned floor into which refuse from the floors is deposited.

6. In combination with an animal house having a framework comprising side and rear walls attached to corner posts by which they are supported above the ground, a door hinged to the front of the house between the side walls and a roof structure mounted on the upper ends of the corner posts; of a floor between the side walls to form a compartment above said floor, a vertical partition below the floor and spaced from the rear wall, a floor extending forwardly from the lower end of the partition to provide a second compartment below the aforementioned compartment, a chute below the last mentioned floor into which refuse from the floors is deposited, and a lid covering the chute and extended at its lower end beyond the same to form a cover for a bucket.

7. In combination with an animal house having a framework comprising side and rear walls attached to corner posts by which they are supported above the ground, a door hinged to the front of the house between the side walls, a roof structure mounted on the upper ends of the corner posts, and floors pivoted between the side walls to form upper and lower compartments, of nest boxes for the compartments supported on one of the side walls thereof and comprising inner and outer boxes with an intermediate air space, and a metal casing fitting over the outer box to protect the nest.

8. In combination with an animal house having a framework comprising side and rear walls attached to corner posts by which they are supported above the ground, a door hinged to the front of the house between the side walls, a roof structure mounted on the upper ends of the corner posts, and floors pivoted between the side walls to form upper and lower compartments, of a feeding device consisting of a box triangular in cross-section open at its inner side and hinged to the outside of one of the side walls of the house over an opening therein, a trough extending into the opening from the lower end of the feed box, and a removable screen forming the inner side of said feed box.

9. In combination with an animal house having a framework comprising side and rear walls attached to corner posts by which they are supported above the ground, a door hinged to the front of the house between the side walls, a roof structure mounted on the upper ends of the corner posts, and floors pivoted between the side walls to form upper and lower compartments, of a feeding device consisting of a box triangular in cross-section open at its inner side and hinged to the outside of one of the side walls of the house over an opening therein, a metal cover for the outside of the feed box extended at its lower end inwardly to form a ledge and trough, and a removable screen resting on the ledge at the inner side of the feed box.

10. In combination with an animal house having a framework comprising side and rear walls attached to corner posts by which they are supported above the ground, a door hinged to the front of the house between the side walls, a roof structure mounted on the upper ends of the corner posts, and floors pivoted between the side walls to form upper and lower compartments, of a feeding device adapted to be inserted through a small opening in the door comprising an attaching block or plate adapted to bear against the outside of the door and having an opening at its lower end, a chute pivoted in said opening, a second block or plate adapted to bear against the inner side of the door and having an opening through which the chute projects from the other block to rest on the bottom of the last mentioned opening, and means for clamping the blocks on the door and for adjusting them with respect to each other for varying the inclination of the chute.

ABRAHAM DEWEY STONER.